(12) United States Patent
Kress

(10) Patent No.: US 12,036,615 B2
(45) Date of Patent: Jul. 16, 2024

(54) TOOL FOR MACHINING A WORKPIECE

(71) Applicant: MAPAL Fabrik für Präzisionswerkzeuge Dr. Kress KG, Aalen (DE)

(72) Inventor: Jochen Kress, Aalen (DE)

(73) Assignee: MAPAL Fabrik für Präzisionswerkzeuge Dr. Kress KG, Aalen (DE)

( * ) Notice: Subject to any disclaimer, the term of this patent is extended or adjusted under 35 U.S.C. 154(b) by 459 days.

(21) Appl. No.: 17/602,977

(22) PCT Filed: Apr. 8, 2020

(86) PCT No.: PCT/EP2020/060007
§ 371 (c)(1),
(2) Date: Oct. 11, 2021

(87) PCT Pub. No.: WO2020/208069
PCT Pub. Date: Oct. 15, 2020

(65) Prior Publication Data
US 2022/0111448 A1    Apr. 14, 2022

(30) Foreign Application Priority Data
Apr. 12, 2019   (DE) ..................... 10 2019 205 364.5

(51) Int. Cl.
*B23B 29/03*    (2006.01)

(52) U.S. Cl.
CPC .......... *B23B 29/03* (2013.01); *B23B 2229/12* (2013.01); *B23B 2270/30* (2013.01)

(58) Field of Classification Search
CPC ......... B23B 29/02; B23B 29/03; B23B 29/12; B23B 47/34; B23B 2229/08;
(Continued)

(56) References Cited

U.S. PATENT DOCUMENTS 2,643,692 A    6/1953   O'Brien
4,168,925 A *  9/1979   Dufresne ............. B23Q 1/0036
                                                  408/59

FOREIGN PATENT DOCUMENTS

CN    202224672 U    5/2012
CN    202984693 U    6/2013
(Continued)

OTHER PUBLICATIONS

Office Action dated Sep. 1, 2023 for Chinese Application No. 202080028195.4. 21 pages.
(Continued)

*Primary Examiner* — Alan Snyder
(74) *Attorney, Agent, or Firm* — Sheppard Mullin Richter & Hampton LLP

(57) ABSTRACT

The invention relates to a tool (1) for machining a workpiece (3), said tool having a longitudinal axis (L), wherein the tool (1) comprises a first machining region (5) and a second machining region (7), wherein the first machining region (5) is spaced apart from the second machining region (7) along the longitudinal axis (L), and wherein a chip protection barrier (9) is located between the first machining region (5) and the second machining region (7), said chip protection barrier being designed to prevent chips removed from a workpiece (3) from passing from one machining region (5, 7) selected from the first machining region (5) and the second machining region (7) into the other machining region (7, 5) selected from the second machining region (7) and the first machining region (5).

12 Claims, 2 Drawing Sheets

Figure 1:
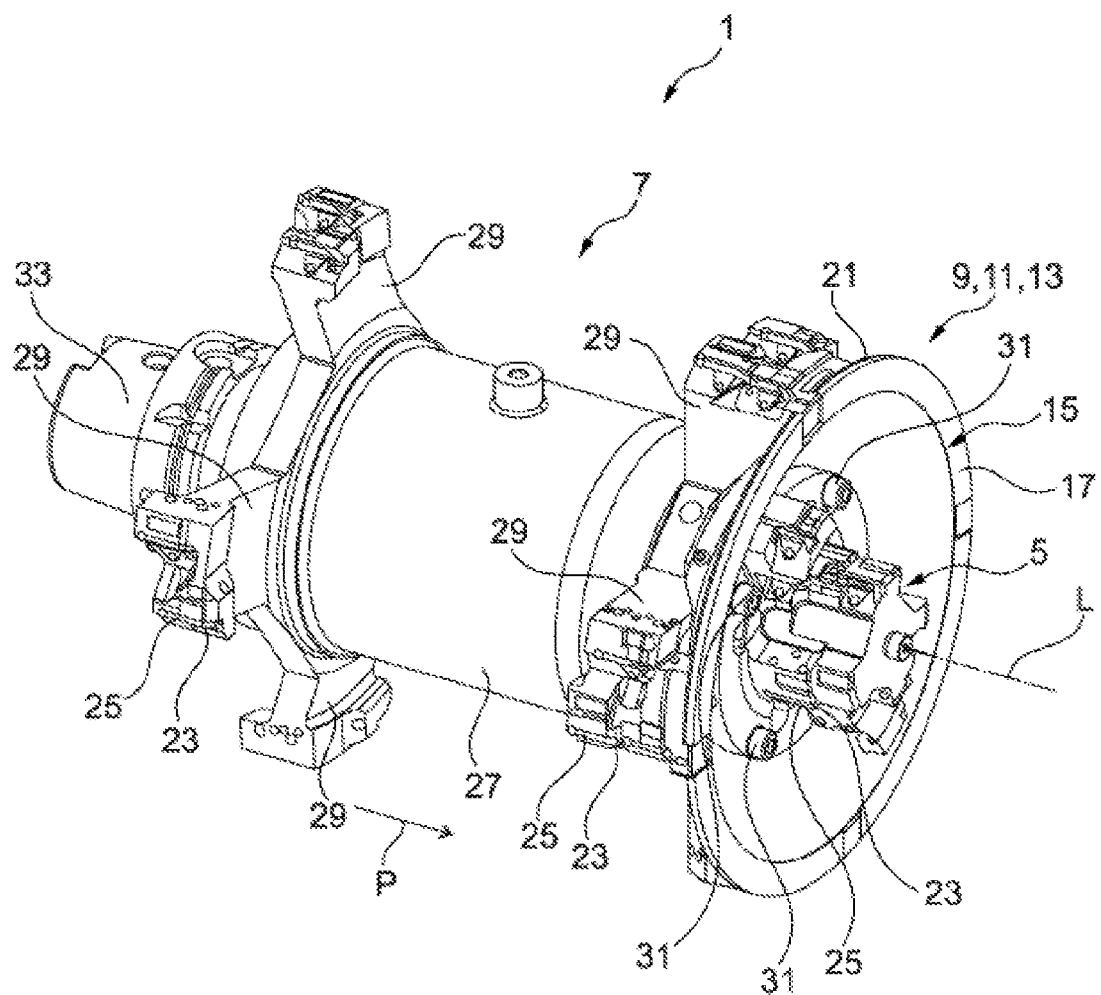

(58) Field of Classification Search
CPC ............ B23B 2229/12; B23B 2229/00; B23B 2260/058; B23B 2270/30
See application file for complete search history.

(56) References Cited

FOREIGN PATENT DOCUMENTS

| | | |
|---|---|---|
| CN | 104439332 A | 3/2015 |
| CN | 205464395 U | 8/2016 |
| CN | 205798469 U | 12/2016 |
| CN | 206153633 U | 5/2017 |
| CN | 108620613 A | 10/2018 |
| CN | 208341821 U | 1/2019 |
| DE | 1117972 B | 11/1961 |
| DE | 10341976 A1 | 4/2005 |
| DE | 102010051338 A1 | 5/2012 |
| GB | 767512 A | 2/1957 |
| JP | H0731204 U | 6/1995 |

OTHER PUBLICATIONS

International Search Report and Written Opinion for PCT/EP2020/060007 dated Oct. 8, 2020, 10 pages.

\* cited by examiner

TOOL FOR MACHINING A WORKPIECE

CROSS REFERENCE TO RELATED APPLICATIONS

This application is a U.S. National Stage Application under 35 U.S.C. 371 of International Application No. PCT/EP2020/060007, filed Apr. 8, 2020, which claims priority to German Patent Application No. 10 2019 205 364.5, filed Apr. 12, 2019. The contents of each of the aforementioned are hereby incorporated by reference in their entirety into the present disclosure.

The invention relates to a tool for machining a workpiece.

Such a tool has a longitudinal axis, as well as a first machining region and a second machining region spaced apart from the first machining region along the longitudinal axis. To machine a workpiece, the tool, also known as a combination tool, and the workpiece are rotated relative to one another around the longitudinal axis, the tool is preferably set in a rotational movement around the longitudinal axis, and the machining regions at the same time or simultaneously remove chips at different, spaced-apart locations from the workpiece. For example, such a tool is used to simultaneously machine a receiving bore for a stator and a mounting bore for mounting a rotor in a stator housing for an electric motor. In such applications, a very high degree of coaxiality between the different bores is sought, in particular because in the example of the stator housing this defines a constancy of an air gap between stator and rotor and thus has a direct effect on the performance and/or the efficiency of the electric motor. It proves to be problematic if chips removed in one of the machining regions can pass into the other machining region and thus reduce the quality of the machined workpiece surface there—either by acting directly on the workpiece surface or by damaging the cutting edges and/or guide strips of the tool. This is particularly problematic when the workpiece has a harder material at one machined point than at the other machined point, the chips of the harder material being able to negatively affect the surface quality at the location of the softer material.

The invention is based on the object of creating a tool in which the disadvantages mentioned do not occur.

The object is achieved in that the present technical teaching is provided, in particular the teaching of the independent claims and the embodiments disclosed in the dependent claims and the description.

The object is achieved in particular in that a tool, in particular a combination tool, of the type discussed above is developed in such a way that a chip protection barrier is arranged between the first machining region and the second machining region. The chip protection barrier is designed to prevent chips, which are removed from the workpiece in one machining region when machining a workpiece, from penetrating into the other machining region. In this way, the surface quality of the workpiece is effectively prevented from being impaired at one location machined by one of the machining regions by chips from another location that is machined via the other machining region. In particular, a very high degree of coaxiality between two bores machined simultaneously via the different machining regions can thus be ensured. In particular, it can be prevented that chips of a hard material adversely affect the surface of a softer material on another location.

The longitudinal axis of the tool is in particular that axis about which the rotation of the tool relative to the workpiece is effected. The longitudinal axis is preferably an axis of symmetry of the tool. The longitudinal axis is preferably an axis of the longest extension of the tool. Preferably, the tool is fed along the longitudinal axis relative to the workpiece during the machining of the workpiece.

An axial direction extends along the longitudinal axis. A radial direction is perpendicular to the longitudinal axis. A circumferential direction concentrically encompasses the longitudinal axis.

A machining region is understood to mean, in particular, a region of the tool in which the tool is designed locally to remove chips from a workpiece, in particular by arranging a cutting edge, in particular a geometrically defined cutting edge, in the machining region.

The chip protection barrier is designed in particular to prevent chips from passing from the first machining region into the second machining region.

According to a development of the invention, it is provided that the first machining region is designed for machining a first, harder material, the second machining region being designed for machining a second, softer—i.e., less hard—material. In this case in particular, the advantages already explained above are realized in a particular way. In particular, the chip protection barrier effectively prevents chips of the first, harder material from penetrating into the region of the second, softer material and there from reducing the surface quality of the workpiece being machined. The first, harder material is in particular harder than the second, softer material. Conversely, the second, softer material is, in particular, less hard, i.e. has a lower hardness than the first, harder material.

The first machining region is preferably designed for machining the first, harder material compared to the second machining region, in that the first machining region has a different cutting material than the second machining region. In particular, a cutting edge of the first machining region is preferably formed from or in another cutting material, i.e. material in the region of the cutting edge, as a cutting edge of the second machining region, as a result of which the various machining regions are designed for machining materials of different hardness.

The first machining region is preferably designed for machining steel. Alternatively or additionally, the second machining region is preferably designed for machining aluminum. In particular, the machining regions preferably have suitable cutting materials for machining the corresponding materials.

According to a further development of the invention, it is provided that the chip protection barrier is designed as a chip protection sheet. This represents a particularly simple, easy-to-manufacture and inexpensive design of the chip protection barrier. The chip protection sheet is formed between the machining regions, preferably so as to be closed all round in the circumferential direction. In this way, the penetration of chips from one machining region into the other machining region is particularly reliably avoided. The chip protection sheet preferably extends in the radial direction up to a larger radius, selected from the radii of the first machining region and the second machining region. The chip protection sheet preferably extends in the radial direction up to the radius of the second machining region.

A radius of a machining region is understood in this case to mean, in particular, the radius of the flight circle of a cutting edge of the machining region, i.e. the largest radius of the corresponding machining region that defines a machining diameter.

A chip protection sheet is understood to mean, in particular, a flat and/or thin configuration of the chip protection barrier. "Thin" is understood in particular to mean that the material of the chip protection barrier has an extension or "thickness" in a first—in particular Cartesian—direction which is much smaller than the extension of the material of the chip protection barrier in the other two—in particular Cartesian—directions.

The chip protection sheet preferably has a metallic material or consists of such a material. Alternatively, it is also possible for the chip protection sheet to have an organic sheet or to be formed from an organic sheet.

According to a development of the invention, it is provided that the chip protection barrier is designed as a chip protection hollow cone which opens towards the first machining region. In this way, the chip protection barrier can particularly efficiently shield the second machining region from the chips removed in the first machining region. In particular, the chip protection barrier is preferably designed as a conical chip protection sheet.

The chip protection hollow cone preferably has an edge running around in the circumferential direction at its foot end. The edge is preferably designed to be resilient and, in this way, suitable to compensate for tolerances in relation to an inner bore surface of the machined workpiece. In a particularly preferred embodiment, the edge has a resilient sealing lip or is designed as a resilient sealing lip.

According to a development of the invention, it is provided that the first machining region has a first machining diameter, wherein the second machining region has a second machining diameter, and wherein the first machining diameter is smaller than the second machining diameter. In this way, bores of different sizes can advantageously be machined via the different machining regions, for example a receiving bore for a stator—in particular via the second machining region—on the one hand and a mounting bore for a rotor—in particular via the first machining region—on the other hand.

The machining diameter of a machining region is preferably defined by the diameter of a flight circle of a cutting edge of the machining region.

The second machining diameter of the second machining region ranges preferably from at least 200 mm to at most 350 mm, preferably from at least 250 mm to at most 300 mm. With these diameter ranges, the tool is particularly suitable for machining a stator housing for an electric motor, in particular for use in the automotive sector, in particular for an electric drive motor of a motor vehicle, in particular an electrically or hybrid-powered passenger vehicle.

According to a development of the invention, it is provided that the first machining region and the second machining region each have at least one geometrically defined cutting edge. A geometrically defined cutting edge is understood to mean, in particular, a cutting edge that is formed in a manner known per se as the line of intersection of a machining surface with a free surface. It is possible that the free surface immediately adjoins the cutting edge and has a round bevel as the first free surface region, which in turn is adjoined by a surface region sloping counter to the machining direction as a second free surface region. In particular, the tool is designed both in the first machining region and in the second machining region for machining with a geometrically defined cutting edge.

The at least one geometrically defined cutting edge is preferably formed on a cutter insert which is fastened to a base body of the tool in the first machining region or in the second machining region. Both the first machining region and the second machining region preferably have a plurality of such cutter inserts.

According to a development of the invention, it is provided that the at least one geometrically defined cutting edge of the first machining region is formed from cermet or hard metal, in particular as a cutting material, the at least one geometrically defined cutting edge of the second machining region being formed from polycrystalline diamond—in the following PCD—in particular as a cutting material. The fact that the geometrically defined cutting edge is formed in a material or cutting material means in particular that it is machined from a body comprising or consisting of this material, in particular is produced by grinding on the body. Cermet and hard metal are particularly suitable for cutting harder materials, in particular steel, with PCD being particularly suitable for cutting less hard materials, in particular aluminum.

According to a development of the invention, it is provided that the first machining region leads the second machining region as seen in the feed direction of the tool. In this way, a first bore can be machined with the first machining region, which is ahead of a second bore in the feed direction, the second bore being machined simultaneously via the second machining region. In particular, a mounting bore for a rotor on a stator housing can be machined with the first machining region, a receiving bore for a stator on the stator housing being machined simultaneously with the second machining region.

The first machining region preferably leads the second machining region as seen in the feed direction of the tool, the second machining region at the same time having a larger machining diameter than the first machining region. This makes it possible to introduce the first machining region through the second, larger bore into the region of the first, smaller bore and then to machine both bores at the same time.

According to a development of the invention, it is provided that the tool has a cylindrical base body. A rib protrudes from the cylindrical base body at least in the second machining region. The at least one geometrically defined cutting edge of the second machining region is arranged on the rib. The tool can thus be designed to be particularly lightweight and at the same time stable, in particular it can be manufactured in a lightweight construction. At least one cutter insert is preferably arranged, in particular fastened, in particular clamped, on the rib. The second machining region preferably has a plurality of ribs protruding from the cylindrical base body, with at least one geometrically defined cutting edge, in particular at least one cutter insert, being arranged on each rib.

It goes without saying that the cylindrical base body has a diameter which is smaller than the second machining diameter of the second machining region. The distance between the diameter of the base body and the second machining diameter is bridged by the at least one rib.

The base body and/or the at least one rib is/are preferably made of a metal or a metal alloy. They can also have different materials, both materials which are different from one another as well as a plurality of materials within a part. It is also possible that at least one part, selected from the base body and the rib, has a fiber-reinforced plastics material or is formed from fiber-reinforced plastics material.

The cylindrical base body is preferably designed to be hollow, in particular as a hollow body. The tool is particularly lightweight in this way, which not least also lowers the energy costs for machining a workpiece.

The first machining region is preferably arranged axially on the end face—at the front in the feed direction—on the base body.

The chip protection barrier is preferably arranged axially on the end face—at the front in the feed direction—on the base body, in particular fastened, in particular screwed onto the base body. The chip protection barrier preferably encompasses the first machining region in the circumferential direction. The chip protection barrier formed as a chip protection hollow cone preferably accommodates the first machining region in regions—as seen in the axial direction.

According to a development of the invention, it is provided that the tool has an interface for clamping the tool in a machine spindle. The interface is preferably arranged opposite the first machining region along the longitudinal direction—at the rear in the feed direction—on the base body. The interface is preferably designed as a conical interface, in particular as a precision interface, or as a cylindrical interface.

According to a development of the invention, it is provided that the tool is designed as a fine boring tool. In this way, the tool is particularly suitable for machining receiving bores and/or mounting bores, in particular on stator housings or gear housings.

According to a development of the invention, it is provided that the tool is designed for machining a motor housing, in particular an electric motor, in particular a stator housing with a receiving bore for a stator and a mounting bore for a rotor. The stator housing is typically made of aluminum, in particular cast aluminum, the receiving bore being formed directly in the aluminum body of the stator housing, and the mounting bore for the rotor being formed in a steel receptacle or steel bushing, which in turn is inserted into a bushing receptacle in the aluminum body. The mounting bore and the receiving bore can now be machined simultaneously, i.e. at the same time, using the tool, without the risk of steel chips passing from the region of the mounting bore into the region of the receiving bore. The mounting bore is machined via the first machining region of the tool, and the receiving bore is machined via the second machining region. With the help of the tool proposed herein, in particular improved coaxiality between the mounting bore and the receiving bore can be ensured, which has a particularly positive effect on the constancy of an air gap between the stator and the rotor of the resulting electric motor, and thus also directly on its performance and/or efficiency.

In particular, the tool is designed for machining a stator housing for an electric motor for use in the automotive sector, in particular for an electric drive motor of a motor vehicle, in particular an electrically or hybrid-powered passenger vehicle.

Alternatively or additionally, the tool is designed for machining a gear housing. In this case, too, it may be necessary or advantageous to machine a plurality of bores, in particular mounting bores, preferably with different materials and/or different diameters, with a very precisely defined coaxiality.

Figure 2:
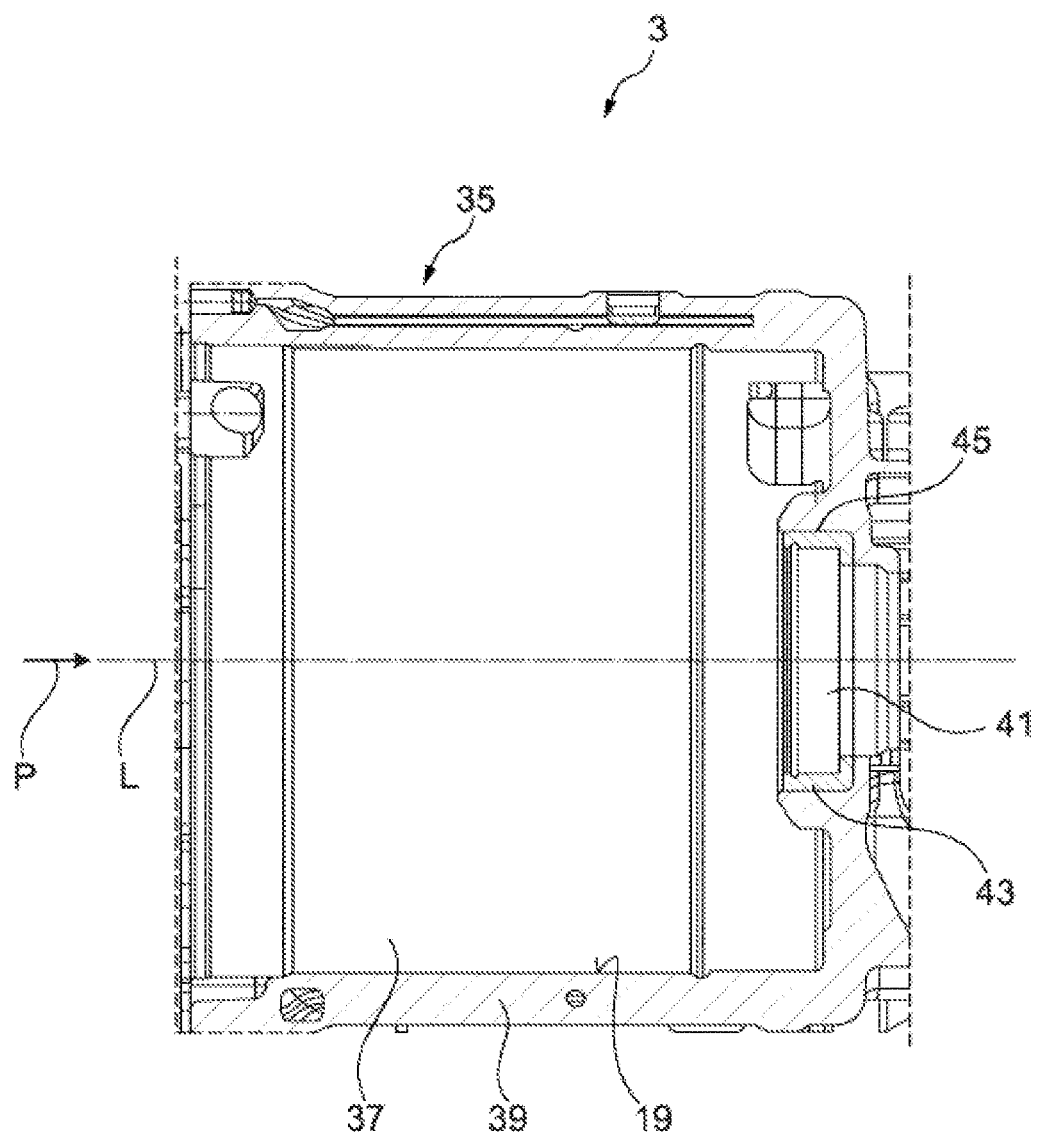

The invention is explained in greater detail below with reference to the drawing. In the drawing:

FIG. 1 is a representation of an embodiment of a tool for machining a workpiece, and FIG. 2 is a representation of an example of a workpiece to be machined with the tool according to FIG. 1.

FIG. 1 shows an illustration of an embodiment of a tool 1 for machining a workpiece 3 shown in FIG. 2. The tool 1 has a longitudinal axis L, as well as a first machining region 5 and a second machining region 7, the first machining region 5 being spaced apart from the second machining region 7 along the longitudinal axis L. A chip protection barrier 9 is arranged between the first machining region 5 and the second machining region 7. This is designed to advantageously prevent chips removed from the workpiece 3 in one of the machining regions 5, 7 from passing into the other machining region 7, 5 of the machining regions 5, 7. In particular, the chip protection barrier 9 prevents chips removed by the first machining region 5 from passing into the region of the second machining region 7. Impairment of a surface of the workpiece 3 machined via the second machining region 7 by chips from the first machining region 5—and vice versa—is thus effectively avoided.

The first machining region 5 is preferably designed for machining a first, harder material, in particular for machining steel, the second machining region 7 being designed for machining a second, softer material, in particular for machining aluminum.

The chip protection barrier 9 is preferably designed as a chip protection sheet 11. The chip protection sheet 11 is formed between the machining regions 5, 7, preferably so as to be closed all round in the circumferential direction around the longitudinal axis L. The chip protection sheet 11 preferably extends in the radial direction up to the largest radius of the second machining region 7.

The chip protection barrier 9 is preferably designed as a chip protection hollow cone 13 which opens towards the first machining region 5. In particular, the chip protection sheet 11 is preferably designed so as to be conical and thus forms the chip protection hollow cone 13.

The chip protection hollow cone 13 preferably has an edge 17 running around in the circumferential direction at the foot end 15 thereof. In a preferred embodiment, the edge 17 is designed to be resilient and, in this way, is particularly suitable to compensate for tolerances in relation to an inner bore surface 19 of the machined workpiece 3 shown in FIG. 2. In a particularly preferred embodiment, the edge 17 has a resilient sealing lip 21 or is designed as a resilient sealing lip 21.

The first machining region 5 has a first machining diameter; the second machining region 7 has a second machining diameter. The first machining diameter is smaller in this case than the second machining diameter.

The second machining diameter ranges preferably from at least 200 mm to at most 350 mm, preferably from at least 250 mm to at most 300 mm.

The first machining region 5 and the second machining region 7 preferably each have at least one geometrically defined cutting edge 23, from which cutting edges, for the sake of clarity, only one geometrically defined cutting edge 23 is identified with the corresponding reference sign in the first machining region 5 and only two geometrically defined cutting edges 23 are identified with the corresponding reference sign in the second machining region 7. The geometrically defined cutting edges 23 are each formed on cutter inserts 25 which are arranged, in particular fastened, preferably clamped, in the machining regions 5, 7. For the sake of clarity, from the cutter inserts 25, only one cutter insert is identified with the corresponding reference sign in the first machining region 5 and only two cutter inserts are identified with the corresponding reference sign in the second machining region 7.

The geometrically defined cutting edges 23 of the first machining region 5 are preferably formed from cermet or hard metal. The geometrically defined cutting edges 23 of the second machining region 7 are preferably formed from PCD.

The first machining region 5 preferably leads the second machining region 7 as seen in the feed direction of the tool 1. The feed direction is indicated by an arrow P in FIG. 1.

The tool 1 preferably has a cylindrical base body 27 from which a rib 29, in particular a plurality of ribs 29, protrudes in the second machining region 7. The geometrically defined cutting edges 23, in particular the cutter inserts 25, of the second machining region 7 are arranged on the ribs 29.

The cylindrical base body 27 is preferably designed to be hollow, in particular as a hollow body. The first machining region 5 is preferably arranged axially on the end face—at the front in the feed direction—on the base body 27.

The chip protection barrier 9 is preferably arranged axially on the end face—at the front in the feed direction—on the base body 27, in particular fastened; in particular, it is screwed to the base body 27 on the front side by means of axial screws 31. In this case, the chip protection barrier 9 encompasses the first machining region 5 in the circumferential direction. In this case, the chip protection hollow cone 13 receives the first machining region 5 in regions—as seen in the axial direction.

In this case, the tool 1 has an interface 33 for clamping the tool 1 in a machine spindle (not shown) on the base body 27, opposite the first machining region 5 along the longitudinal direction—at the rear in the feed direction. In a preferred embodiment, the interface 33 is designed as a conical interface, in particular as a precision interface. But it can also be designed as a cylindrical interface.

The embodiment of the tool 1 shown in this case is designed as a fine boring tool.

The tool 1 is designed in particular for machining a motor housing, in particular a stator housing with a receiving bore for a stator and a mounting bore for a rotor. Alternatively, it can be designed for machining a gear housing.

FIG. 2 is a representation of an example of a workpiece 3 to be machined with the tool 1. In a preferred embodiment, the workpiece 3 is a stator housing 35 for an electric motor, in particular for use in the automotive sector, in particular for an electric drive motor of a motor vehicle, in particular an electrically or hybrid-powered passenger vehicle.

In FIG. 2, the longitudinal axis L is also shown, around which a relative rotation between the tool 1 and the workpiece 3 is effected for machining the workpiece 3 with the tool 1, as well as the arrow P, which indicates the feed direction of the tool 1 when machining the workpiece 3 along the longitudinal axis L.

The stator housing 35 is preferably made of aluminum, in particular cast aluminum, a receiving bore 37 for a stator preferably being formed directly in an aluminum body 39 of the stator housing 35. A mounting bore 41 for a rotor of the electric motor is formed in a steel receptacle or steel bushing 43, which in turn is inserted into a bushing receptacle 45 of the aluminum body 39.

The mounting bore 41 and the receiving bore 37 are machined simultaneously with the tool 1. Because of the chip protection barrier 9, there is no risk of steel chips passing from the region of the mounting bore 41 into the region of the receiving bore 37.

The mounting bore 41 is machined via the first machining region 5 of the tool 1. The receiving bore 37 is machined at the same time via the second machining region 7.

With the help of the tool 1 proposed herein, in particular improved coaxiality between the mounting bore 41 and the receiving bore 37 can be ensured, which has a particularly positive effect on the constancy of an air gap between the stator and the rotor of the resulting electric motor, and thus also directly on its performance and/or efficiency.

The invention claimed is:

1. A tool (1) for machining a workpiece (3), said tool having
a longitudinal axis (L), wherein
the tool (1) comprises a first machining region (5) and a second machining region (7), wherein
the first machining region (5) is spaced apart from the second machining region (7) along the longitudinal axis (L), characterized in that
a chip protection barrier (9) is located between the first machining region (5) and the second machining region (7), said chip protection barrier being designed to prevent chips removed from a workpiece (3) from passing from one machining region (5, 7) selected from the first machining region (5) and the second machining region (7) into the other machining region (7, 5) selected from the second machining region (7) and the first machining region (5).

2. The tool (1) according to claim 1, characterized in that the first machining region (5) is designed for machining a first, harder material, the second machining region (7) being designed for machining a second, softer material.

3. The tool (1) according to claim 1, characterized in that the chip protection barrier (9) is designed as a chip protection sheet (11).

4. The tool (1) according to claim 1, characterized in that the chip protection barrier (9) is designed as a chip protection hollow cone (13) which opens towards the first machining region (5).

5. The tool (1) according to claim 1, characterized in that the first machining region (5) has a first machining diameter, wherein the second machining region (7) has a second machining diameter, and wherein the first machining diameter is smaller than the second machining diameter.

6. The tool (1) according to claim 1, characterized in that the first machining region (5) and the second machining region (7) each have at least one geometrically defined cutting edge (23).

7. The tool (1) according to claim 1, characterized in that the at least one geometrically defined cutting edge (23) of the first machining region (5) is formed from cermet or hard metal, the at least one geometrically defined cutting edge (23) of the second machining region (7) being formed from polycrystalline diamond.

8. The tool (1) according to claim 1, characterized in that the first machining region (5) leads the second machining region (7) as seen in the feed direction of the tool (1).

9. The tool (1) according to claim 1, characterized in that the tool (1) has a cylindrical base body (27) from which at least one rib (29) protrudes at least in the second machining region (7), on which rib the at least one geometrically defined cutting edge (23) of the second machining region (7) is located.

10. The tool (1) according to claim 1, characterized by an interface (33) for clamping the tool (1) in a machine spindle.

11. The tool (1) according to claim 1, characterized in that the tool (1) is designed as a fine boring tool.

12. The tool according to claim 1, characterized in that the tool is designed for machining a motor housing or for machining a gear housing.

* * * * *